3,557,182
PROCESS FOR PRODUCING
CYANOCYCLOHEXANOLS
Hideo Nagata and Toshio Tamaki, Osaka-fu, and Hiroaki Moriyama, Nishinomiya-shi, Japan, assignors to Sumitomo Chemical Co., Ltd., Higashi-ku, Osaka-shi, Japan
No Drawing. Filed June 21, 1968, Ser. No. 738,811
Claims priority, application Japan, June 22, 1967, 42/40,252; Feb. 14, 1968, 43/9,497
Int. Cl. C07c *121/46*
U.S. Cl. 260—464    13 Claims

ABSTRACT OF THE DISCLOSURE 3-cyanocyclohexanol and 4-cyanocyclohexanol are prepared selectively by reducing trans-1-cyano-3,4-epoxycyclohexane and cis-1-cyano-3,4-epoxycyclohexane with sodium borohydride or hydrogenating in the presence of a hydrogenation catalyst, such as, palladium or ruthenium. These cyanocyclohexanols are useful as intermediates in the synthesis of agricultural chemicals.

BACKGROUND OF THE INVENTION

(1) Field of the invention

The present invention relates to cyanocyclohexanols. More particularly, it pertains to 3-cyanocyclohexanol or 4-cyanocyclohexanol and a process for their preparation.

There have never been reported 3-cyanocyclohexanol and 4-cyanocyclohexanol or a process for preparing them. Thus, these materials are novel compounds.

(2) Description of the prior art 1-cyano-3,4-epoxycyclohexane is a known compound and may be prepared by the following procedure:

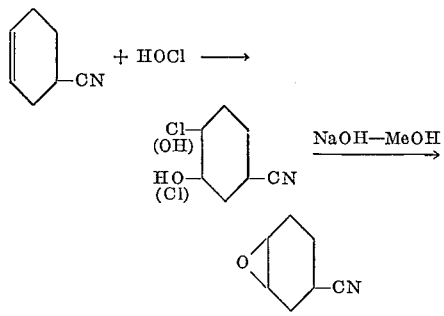

(cf. H. Hopff and H. Hoffmann, "Helvetica Chimica Acta," vol. 40, page 1585 (1957).)

However, since in the known process, 1-cyano-3,4-epoxycyclohexane is prepared in two steps, the operation is complicated and further, in such a known process, the trans-form is not separated from the cis-form.

Cyanophenols are useful as intermediates for agricultural chemicals and medicines.

SUMMARY OF THE INVENTION

The inventors have studied the production of cyanocyclohexanols on considering that cyanophenols may be prepared by dehydrogenating cyanocyclohexanols. As a result, the inventors have found that the novel compound, 3- or 4-cyanocyclohexanol can be produced by reducing 1-cyano-3,4-epoxycyclohexane with a reducing agent or hydrogenating the epoxycyclohexane using a hydrogenation catalyst.

Furthermore, the inventors have found that 1-cyano-3,4-epoxycyclohexane chemically prepared is a mixture of the trans-form and the cis-form but by subjecting the mixture to a distillation under reduced pressure, the trans-form can be easily separated from the cis-form and that reducing or hydrogenating the trans-form as above, 3-cyanocyclohexanol is selectively obtained, while by reducing or hydrogenating the cis-form, 4-cyanocyclohexanol is selectively obtained.

Moreover, it has been found that 1-cyano-3,4-epoxycyclohexane can be prepared in one step by the oxidation of 3-cyclohexene-1-carbonitrile as shown in the following formula

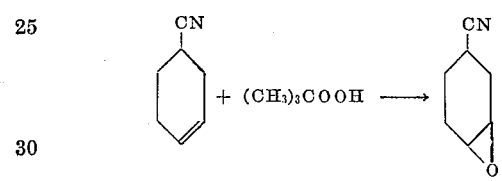

Therefore, an object of the present invention is to provide 3-cyanocyclohexanol or 4-cyanocyclohexanol, which is a novel material.

Another object of this invention is to provide a process for preparing 3-cyanocyclohexanol or 4-cyanocyclohexanol.

Other objects and advantages of this invention will become apparent from the following descriptions.

According to the present invention, therefore, novel compounds, cyanocyclohexanols having the formula,

wherein —OH is at the 3- or 4- position of —CN, is provided.

Also, according to this invention, 1-cyano-3,4-epoxycyclohexane is caused to react with sodium borohydride or caused to react with 1 mol of hydrogen per 1 mol of said epoxycyclohexane in the presence of a hydrogenation catalyst selected from palladium and ruthenium compounds to provide cyanocyclohexanols of the Formula I.

DETAILED DESCRIPTION OF THE INVENTION

The reactions relating to the present invention may be represented, for example, by the following chemical reaction formulae:

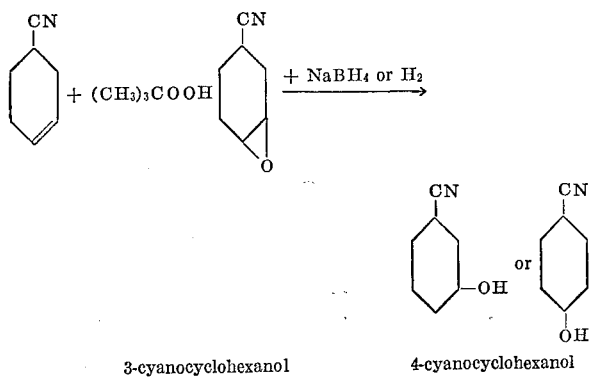

3-cyanocyclohexanol      4-cyanocyclohexanol

The novel compound, 3-cyanocyclohexanol or 4-cyanocyclohexanol of this invention is prepared by reacting 1-cyano-3,4-epoxycyclohexane with sodium borohydride or reacting one mol of 1-cyano-3,4-epoxycyclohexane with one mol of hydrogen in the presence of a hydrogenation catalyst.

1-cyano-3,4-epoxycyclohexane chemically prepared is a mixture of the trans-form and the cis-form thereof and when the trans-form is employed as the raw material in the above reaction, 3-cyanocyclohexanol is obtained, while when the cis-form is employed, 4-cyanocyclohexanol is obtained. Of course, when a mixture of the trans-form and the cis-form is used, a mixture of 3-cyanocyclohexanol and 4-cyanocyclohexanol is obtained.

It has been known that in some cases the cleaving position of an epoxy ring cleavage reaction is influenced by the substituent but it has never been known that, as in the present invention, the cleaving position of an epoxy ring is influenced only by the cis-, trans- conformation of the epoxy compound. Accordingly, in the process of this invention, 3-cyanocyclohexanol and 4-cyanocyclohexanol can be obtained each in pure state without forming a mixture thereof from which the separation of each other is difficult, which makes the invention very profitable.

In the case of reducing by sodium borohydride, the reduction is conducted in a solvent. Examples of the solvent preferably employed are methanol, ethanol, tetrahydrofuran, pyridine and dioxane. The reaction proceeds even at room temperature but, if necessary, the reaction may be carried out while heating the system to a temperature lower than 100° C. The amount of sodium borohydride is generally 0.25 mol per one mol of the epoxide or slightly larger than the value. In general, at the practice of the reduction, the material to be reduced may be added dropwise to a solution of sodium borohydride in a constant rate or vice versa.

In a profitable embodiment of the process of this invention, after the end of the reaction, a complex compound formed by the reaction of 1-cyano-3,4-epoxycyclohexane and sodium borohydride is decomposed under an acidic state, the decomposition product is extracted with a proper solvent insoluble in water and after removing the solvent by distillation, the resdiue is subjected to a distillation under reduced pressure to provide 3- or 4-cyanocylohexanol.

On the other hand, in the case of conducting the hydrogenation in the presence of a catalyst, a proper hydrogenation catalyst is employed for the selective hydrogenation of the epoxy group. The preferable examples of the catalyst, are catalysts having larger surface areas, such as, palladium and ruthenium type catalysts. The examples of the palladium type catalyst are catalysts composed of carbon, barium sulfate, calcium carbonate, etc., carrying thereon 5% to 10% palladium as described in R. Mozingo; "Organic Synthesis"; Col vol. 3, page 685 and a PdO catalyst as described in R. L. Shriner and R. Adams; "Journal of the American Chemical Society"; 46, 1683 (1924). As the ruthenium catalyst, there are a RuO$_2$ catalyst as described in H. Pichler and H. Buffleb; "Brennstoff-Chemie" 21 257 (1940) and a Ru-carrier catalyst (5% Ru) as described in G. C. Bond and G. Webb; "Platinum Metals Review" 6 12 (1962).

The hydrogenation can be conducted effectively regardless of the presence of a solvent but in the case of conducting the reaction in a solvent, there may be preferably employed alcohols such as methanol and ethanol; ethers such as ethyl ether, tetrahydrofuran, and dioxane; aliphatic hydrocarbons, and aromatic hydrocarbons.

The reaction temperature for the hydrogenation is usually 0–100° C., preferably 10–50° C., and the hydrogen pressure during hydrogenation is from normal pressure to 50 kg./sq. cm. gauge, preferably from normal pressure to 30 kg./sq. cm. gauge. When the hydrogenation is conducted in mild reaction condition, that is, it is conducted at a reaction temperature lower than 50° C. and at a hydrogen pressure of lower than 30 kg./sq. cm. gauge, the reaction provides only cyanocyclohexanol but when the reaction condition becomes severe, the cyano group tends to be reduced to produce by-products reduced more highly than the cyanocyclohexanol. However, the side reaction not always occurs at the reduction to the cyanocyclohexanol and by suppressing the amount of hydrogen to be absorbed to about one mol per one mol of 1-cyano-3,4-epoxycyclohexane the formation of the side-reaction can be completely inhibited.

The reaction period of time for the catalytic hydrogenation is considerably varied depending on the kind of catalyst, the amount of catalyst, the kind of solvent, the hydrogen pressure, and the hydrogenation temperature, but usually from two hours to 40 hours.

The amount of the catalyst is, for example, 1–5% of the weight of the epoxide at a temperature of from room temperature to 50° C. and at a pressure of from normal pressure to 5 kg./sq. cm. gauge.

The separation of the product from the reaction product mixture is profitably conducted by removing the catalyst by filtration from the mixture and, after removing solvent by distillation in case the reaction is conducted in the solvent, subjecting the residue to a rectification under a reduced pressure.

According to the process of this invention, the product can be almost quantitatively obtained with a yield of higher than 90%.

The structure of the product is determined by identification of a corresponding carboxylic acid, which is obtained by hydrolyzing the product with a known hydroxycyclohexanecarboxylic acid.

1-cyano-3,4-epoxycyclohexane obtained by a chemical method is a stereoisomeric mixture, but profitably, the stereoisomers have such vapor pressure difference that they can be separated completely from each other by fractionation and hence the isomers can be separated from each other by subjecting the mixture to a reduced pressure distillation. It is preferable to conduct the reduced pressure distillation under a pressure of 1–30 mm. Hg. By the distillation, the trans-form is obtained as the first fraction (lower boiling fraction), e.g., a fraction of 78–79° C. at a pressure of 2 mm. Hg or a fraction of 120–123° C. at 20 mm. Hg, while the cis-form is obtained as the second fraction (higher boiling fraction), e.g., a fraction of 90–91° C. at a pressure of 2 mm. Hg or a fraction of 138–140° C. at 20 mm. Hg. It is preferable to use a packed column having a theoretical plate number of 20–50. Usually, each of the isomers can be obtained with a purity higher than 99% by a manner wherein the first fraction is distilled off, while the second fraction is recovered as the pot residue without being distilled off. In addition, the ratio of the trans-form to the cis-form in the mixture is usually from 1.6 to 2.5.

Furthermore, according to the process of this invention, 1-cyano-3,4-epoxycyclohexane can be obtained by the epoxidation of 3-cyclohexene-1-carbonitrile with an organic hydroperoxide such as tertiary butyl hydroperoxide and cumene hydroperoxide more profitably than a conventional process.

The epoxidation is conducted as follows:

An organic hydroperoxide is added dropwise to an excessive amount of 3-cyclohexene-1-carbonitrile at a definite temperature. In the reaction system may be incorporated a catalytic amount of a soluble salt of metal. The use of a solvent in the reaction is not always necessary, but the use of solvent usually facilitates the temperature control.

As the solvent may be employed one capable of dissolving the raw material and the product, such as, alcohols, ethers, esters and the like.

The reaction temperature is generally from room temperature to 100° C. The reaction may desirably be conducted at 50–90° C.

For preventing the by-production of impurity such as glycols, it is preferable to maintain the reaction system in a water-free state.

Examples of the soluble salts of metals are preferably soluble salts of molybdenum, vanadium, or tungsten, but those of molybdenum are most preferable.

The status of the reaction can be observed by analyzing the remaining amount of the hydroperoxide to determine the end point. The reaction period of time depends upon the kind of catalyst, the amount of catalyst, the kind of solvent, the excess amount of 3-cyanocyclohexene-1-carbonitrile and the reaction temperature, but it is preferably, for example, several to 30 hours at 80° C.

When a hydroperoxide which cannot be subject to distillation is used, after the reaction is finished, the hydroperoxide, if any, is decomposed in a proper manner and thereafter the product is separated from unreacted 3-cyanocyclohexene-1-carbonitrile by distillation.

However, when t-butylhydroperoxide which can be distilled is used, the solvent is distilled off under reduced pressure and the residue is distilled to separate the objective epoxide from unreacted 3-cyanocyclohexene-1-carbonitrile and the hydroperoxide.

When the reaction is conducted in a system substantially free from water, and 3-cyclohexene-1-carbonitrile is recovered using t-butylhydroperoxide, the yield is almost quantitative (the hydroperoxide is almost completely consumed to provide an epoxide quantitatively).

3-cyclohexene - 1-carbonitrile may be prepared by reacting butadiene and acrylonitrile (cf. H. J. Pistor and H. Plieninger; "Justus Liebig's Annalen der Chemie"; 562, 239 (1949)).

3-cyanophenol and 4-cyanophenol are useful as raw materials for agricultural chemicals such as o,o-dimethyl-o-(4-cyanophenyl)-phosphorothioate, o-ethyl-o-(4-cyanophenyl)benzenephosphorothioate, 4-cyano - 2,6 - diiodophenol, and 4-cyano-2, 6-dibromophenol. 3-cyanocyclohexanol and 4-cyanocyclohexanol of the present invention may be useful for preparing these cyanophenols.

The invention will now be explained by the following examples for the purpose of illustrating the present invention, but the invention shall not be limited to them.

EXAMPLE 1

Stage 1

A mixture of 268.0 g. (2.50 mols) of 3-cyclohexene-1-carbonitrile, 215.0 g. (2.39 mols) of t-butyl hydroperoxide, and 300 ml. of t-butyl alcohol was held for 18 hours at 80° C. with the addition of a catalytic amount of molybdenum (II) acetylacetonate. After removing by distillation t-butyl alcohol used as the solvent, t-butyl alcohol by-produced by the reaction, and a small amount of t-butyl hydroperoxide, the unreacted 3-cyclohexene-1-carbonitrile was distilled off at a slightly lower pressure, and finally the product was distilled off at much lower pressure. By the distillation, 264.0 g. of a fraction of 1-cyano-3,4-epoxycyclohexane, 75–87° C./1.5 mm. Hg, was obtained. The yield for the product was 89% based on t-butyl hydroperoxide used.

Stage 2

The reduced-pressure fractionation of 1-cyano-3,4-epoxycyclohexane was conducted in a vacuum-jacket type distillation column having a packing section of 18 mm. in diameter and 800 mm. in length and equipped with a still head having an automatic reflux ratio controlling means.

First Fraction: distilled at 78–79° C./2 mm. Hg.

Second Fraction: remainder further distilled; at 90–91° C./2 mm. Hg.

Stage 3a

In 50 ml. of methanol was dissolved 3.0 g. (0.080 mol) of sodium borohydride and, while maintaining the solution thus prepared at a temperature lower than 20° C., a solution of 6.0 g. (0.049 mol) of 1-cyano-3,4-epoxycyclohexane obtained at Stage 1 in 30 ml. of methanol was added dropwise to the solution over a 30 minute period. Then, the system was held for 16 hours at 20–25° C. to finish the reaction. Thereafter, the reaction mixture was poured into 500 ml. of water, and after adjusting the pH thereof to 4 with the addition of acetic acid, the resultant solution was stirred for 15 minutes and then neutralized with sodium carbonate. The aqueous solution prepared was concentrated and precipitate formed was extracted with ether. The ether-containing layer thus recovered was dried and ether was distilled off therefrom to provide 6.0 g. of a viscous liquid product, which was a mixture of 3-cyanocyclohexanol and 4-cyanocyclohexanol having a boiling point range of 98–106° C./1 mm. Hg. Elementary analysis.—Calculated (percent): C, 67.20; H, 8.87; N, 11.19. Found (percent): C, 67.45; H, 9.00; N, 11.11.

Stage 3b

A 1 liter stainless steel autoclave was charged with 2.0 g. (0.017 mol) of 1-cyano-3,4-epoxycyclohexane obtained at stage 1, 200 ml. of anhydrous ethanol, and 0.2 g. of a palladium-carbon catalyst (10% palladium), and while supplying 3 kg./sq. cm. gauge of hydrogen, the system was reacted for 30 hours at 30° C. with stirring. Upon calculating the amount of hydrogen absorbed from the reduced value of the hydrogen pressure, it was about 90% of the theoretical amount. After removing the catalyst and also removing ethanol by distillation, the residue was distilled to provide 1.7 g. of a viscous liquid product having a boiling point range of 98–106° C./1 mm. Hg. The product was a mixture of 3-cyanocyclohexanol and 4-cyanocyclohexanol.

EXAMPLE 2

A solution of 3.0 g. (0.080 mol) of sodium borohydride in 50 ml. of methanol was maintained at a temperature of 20° C. and to this solution was added dropwise a solution of 6.0 g. (0.049 mol) of the first fraction of 1-cyano-3,4-epoxy-cyclohexane obtained at Stage 2 of Example 1 in 30 ml. of methanol over a 30 minute period. Then, the system was held for 16 hours at 20–25° C. to complete the reaction.

Thereafter, the reaction mixture was poured into 500 ml. of water, the pH of the solution was adjusted to 4 with the addition of acetic acid followed by stirring for 15 minutes, and thereafter the resulting solution was neutralized with sodium carbonate. The aqueous solution thus formed was concentrated, the precipitated solids were extracted with ether, and after drying the ether-containing layer, ether was removed by distillation therefrom to provide 6.0 g. of a viscous liquid product. The product thus obtained was 3-cyanocyclohexanol having a boiling point of 98° C./1 mm. Hg. The structure of the compound was confirmed by the fact that the distillation product gave trans-3-hydroxycyclohexanecarboxylic acid upon hydrolysis.

EXAMPLE 3

A 500 ml. autoclave made of stainless steel was charged by 1.0 g. (0.008 mol) of the first fraction of 1-cyano-3,4- epoxycyclohexane obtained at Stage 2 of Example 1, 100 ml. of absolute ethanol, and 0.1 g. of a palladium-carbon catalyst (10% palladium) and after filling the space of the autoclave with 3 kg./sq. cm. gauge of hydrogen followed by stirring sufficiently, the stirring was continued for 30 hours at 30° C. The amount of hydrogen absorbed in the system calculated from the reduced value of hydrogen was about 75% of the theoretical amount. After removing the catalyst by filtration and ethanol by distillation under a reduced pressure from the reaction mixture, the residue was subjected to a reduced pressure distillation to provide 0.7 g. of 3-cyanocyclohexanol having a boiling point of 98° C./1 mm. Hg. The structure thereof was confirmed as in Example 2.

EXAMPLE 4

A similar procedure to Example 2 was repeated while employing the second fraction of 1-cyano-3,4-epoxycyclohexane obtained at Stage 2 of Example 1 instead of the first fraction thereof to provide 6.0 g. of a viscous liquid product. The product was confirmed to be 4-cyanocyclohexanol having a boiling point of 105° C./1 mm. Hg. The structure thereof was confirmed by the fact that the product gave cis-4-hydroxycyclohexanecarboxylic acid upon hydrolysis.

EXAMPLE 5

A similar procedure to Example 3 was repeated while employing the second fraction of 1-cyano-3,4-epoxycyclohexane obtained at Stage 2 of Example 1 instead of the first fraction thereof to provide 0.9 g. of 4-cyanocyclohexanol having a boiling point of 105° C./1 mm. Hg. The amount of hydrogen absorbed was 95% of the theoretical amount. The structure of the product was determined as in Example 4.

EXAMPLE 6

A 500 ml. autoclave made of stainless steel was charged by 1.0 g. (0.008 mol) of the first fraction of 1-cyano-3,4-epoxycyclohexane obtained at Stage 2 of Example 1. 100 ml. of absolute ethanol, and 0.2 g. of a ruthenium-carbon (5% ruthenium) catalyst, and after introducing therein 5 kg./sq. cm. gauge of hydrogen, the reaction mixture was stirred for 30 hours at 30° C. After removing the catalyst by filtration and the solvent under a reduced pressure from the reaction mixture, the residue was subjected to a reduced pressure distillation to provide 0.9 g. of 3-cyanocyclohexanol having a boiling point of 98° C./1 mm. Hg. The structure thereof was determined as in Example 2.

EXAMPLE 7

A procedure similar to Example 6 was repeated while using the second fraction of 1-cyano-3,4-epoxycyclohexane obtained at Stage 2 of Example 1 instead of the first fraction thereof to provide 0.9 g. of 4-cyano-cyclohexanol having a boiling point of 105° C./1 mm. Hg. The theoretical amount of hydrogen was absorbed in the system. The structure of the product was determined as in Example 4.

EXAMPLE 8

A 100 ml. normal pressure type hydrogenation vessel made of glass was charged 5.0 g. (0.040 mol) of the first fraction of 1-cyano-3,4-epoxycyclohexane obtained at Stage 2 of Example 1, 50 ml. of absolute ethanol, and 1.0 g. of a palladium carbon catalyst (10% Pd) and the hydrogenation was conducted at room temperature and at normal pressure. By the hydrogenation the theoretical amount of hydrogen was absorbed in about 5 hours. After removing the catalyst by filtration and ethanol under a reduced pressure from the reaction mixture, the residue was subjected to a reduced pressure distillation to provide 4.5 g. of 3-cyanocyclohexanol having a boiling point of 98° C./1 mm. Hg. The structure thereof was determined as in Example 2.

EXAMPLE 9

A procedure similar to that of Example 8 was repeated while employing the second fraction of 1-cyano-3,4-epoxycyclohexane obtained at Stage 2 of Example 1 instead of the first fraction thereof to provide 4.5 g. of 4-cyanocyclohexanol having a boiling point of 105° C./1 mm. Hg. The theoretical amount of hydrogen was absorbed. The structure was determined as in Example 4.

What is claimed is:

1. A process for the preparation of cyanocyclohexanol having the formula,

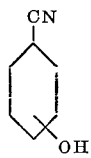

wherein —OH is at the 3- or 4-position of —CN, which comprises reacting 1-cyano-3,4-epoxycyclohexane with from about 0.25 mol of sodium borohydride per 1 mol of said epoxycyclohexane in a solvent at a temperature within the range of from room temperature to a temperature lower than 100° C. to thereby form a complex compound, decomposing said complex compound under an acidic state to provide a decomposition product, extracting the decomposition product with a solvent which is insoluble in water, removing the solvent by distillation to provide a residue, and subjecting the residue to distillation under reduced pressure.

2. The process of claim 1 wherein said 1-cyano-3,4-epoxycyclohexane is the trans-form and the cyanocyclohexanol is 3-cyanocyclohexanol.

3. A process according to claim 1 wherein said 1-cyano-3,4-epoxycyclohexane is the cis-form and the cyanocyclohexanol is 4-cyanocyclohexanol.

4. A process for the preparation of cyano-cyclohexanol having the formula

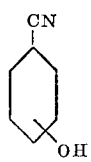

wherein —OH is at the 3- or 4-position of —CN, which comprises reacting 1-cyano-3,4-epoxycyclohexane with an equimolar amount of hydrogen in the presence of from 1 to 5% by weight of the epoxycyclohexane of said hydrogenation catalyst selected from the group consisting of palladium and ruthenium containing catalysts at a temperature in the range of from 0° C. to 100° C. and at a hydrogen pressure of from atmospheric pressure to 50 kg./sq. cm. gauge for a period of time of from 2 to 40 hours, and removing the catalyst by filtration from the reaction product mixture.

5. The process of claim 4 wherein said reaction is conducted in the presence of a solvent, and, subsequent to removing said catalyst from the reaction product mixture by filtration, said solvent is removed by distillation to yield a residue, and said residue is subjected to rectification under reduced pressure.

6. The process according to claim 4 wherein said 1-cyano-3,4-epoxycyclohexane is the trans-form and the cyanocyclohexanol is 3-cyanocyclohexanol.

7. A process according to claim 4 wherein said 1-cyano-3,4-epoxycyclohexane is the cis-form and the cyanocyclohexanol is 4-cyanocyclohexanol.

8. The process according to claim 5 wherein said 1-cyano-3,4-epoxycyclohexane is the trans-form and the cyanocyclohexanol is 3-cyanocyclohexanol.

9. A process according to claim 5 wherein said 1-cyano-3,4-epoxycyclohexane is the cis-form and the cyanocyclohexanol is 4-cyanocyclohexanol.

10. A process as in claim 10 wherein the temperature of reaction is from room temperature to about 50° C., and the pressure of reaction is from atmospheric pressure to 5 kg./sq. cm. gauge.

11. The process of claim 4 wherein said catalyst is selected from the group consisting of from 5% to 10% palladium carried on an inert support; palladium oxide; ruthenium oxide; and ruthenium supported on an inert carrier.

12. The catalyst of claim 11 wherein said catalyst is ruthenium supported on a carrier in an amount of 5% ruthenium.

13. The process of claim 4 wherein said catalyst consists essentially of from 5% to 10% of a member selected from the group consisting of palladium, ruthenium, palladium oxide and ruthenium oxide supported on an inert carrier.

References Cited

Doucet et al., C.A., vol. 48, pp. 10530–10531 (1954).

JOSEPH P. BRUST, Primary Examiner

U.S. Cl. X.R.

260—348, 465, 514